F. STROSSER.
TROLLEY.
APPLICATION FILED JULY 29, 1914.
1,122,815.
Patented Dec. 29, 1914.
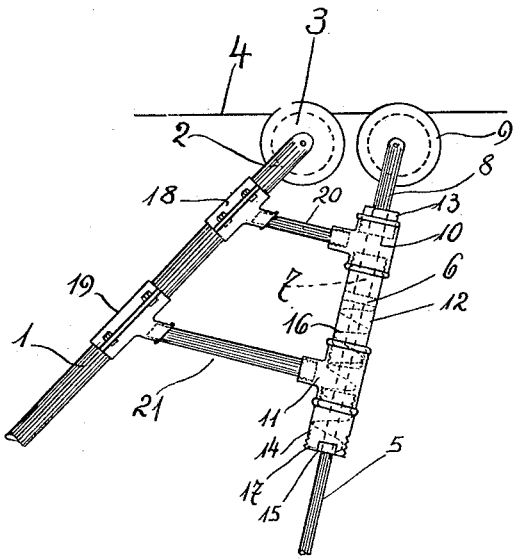
WITNESSES
INVENTOR
Frank Strosser
By Henry C. Evert
ATTORNEY

UNITED STATES PATENT OFFICE.

FRANK STROSSER, OF CLEVELAND, OHIO.

TROLLEY.

1,122,815.  Specification of Letters Patent.  Patented Dec. 29, 1914.

Application filed July 29, 1914. Serial No. 853,909.

*To all whom it may concern:*

Be it known that I, FRANK STROSSER, a subject of the King of Hungary, residing at Cleveland, in the county of Cuyahoga and State of Ohio, have invented certain new and useful Improvements in Trolleys, of which the following is a specification, reference being had therein to the accompanying drawing.

This invention relates to trolleys and has for its object to provide a device of such class in a manner as hereinafter set forth, with a pair of trolley wheels, having means associating therewith, whereby when one wheel leaves a trolley wire it will not cause the misplacement of the other trolley wheel with respect to the trolley wire.

Further objects of the invention are to provide a trolley which is comparatively simple in its construction and arrangement, strong, durable, efficient and convenient in its use, readily set up and comparatively inexpensive to manufacture.

With the foregoing and other objects in view the invention consists of a novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

The drawing illustrates a side elevation of a trolley in accordance with this invention.

Referring to the drawing by reference characters 1 denotes a trolley pole, having its upper end provided with a harp 2, in which is journaled a trolley wheel 3, adapted to travel against the trolley wire 4.

The reference character 5 denotes a support, which is fixedly secured at its upper end to the base 6 of the shank 7, of a harp 8, in which is journaled a trolley wheel 9 to travel against the trolley wire 4.

The reference character 10 denotes the upper T-coupling and the reference character 11 a lower T-coupling. The couplings 10, 11 are connected together by a cylindrical sleeve 12, the latter having threaded engagement with the interior of the coupling 10 and threaded engagement with the interior of the coupling 11. Connected within the upper end of the coupling 10 and projecting therefrom is a collar 13, and connected within and projecting from the lower end of the coupling 11 is a cup-shaped member 14 having its bottom provided with a centrally disposed opening 15 for the passage of the support 5. The stem 7 of the harp 8 extends into the sleeve 12 and projects outwardly from the collar 13. The support 5 extends through the member 14, coupling 11, and the sleeve 12. For normally maintaining the wheel 9 against the trolley wire 4, a coil spring 16 is employed and which surrounds the support 5 and is interposed between the base 6 and the bottom 7 of the member 14. The arrangement set forth permits of the couplings 10 and 11, sleeve 12, collar 13 and member 14 moving downwardly independent of the support 5.

The pole 1 is provided with an upper clamp 18 and a lower clamp 19 and the former is attached to the coupling 10 by a connecting bar 20. Clamp 19 is secured to the coupling 11 through the medium of a connecting bar 21. By this arrangement when the pole 1 lowers, the couplings 10, 11 and sleeve 14 will move independent of the support 5 and when the latter lowers, it will move independent of the pole 1. Spring 16 normally tends to maintain the wheel 9 in engagement with the trolley wire 4 so if the wheel 3 should jump the wire, the wheel 9 will be in engagement therewith. The pole 1 is connected to the car in any suitable manner.

What I claim is:—

A trolley comprising a pole having a harp, a trolley wheel journaled in the latter, an upper and a lower clamp carried by said pole, connecting bars projecting from said clamps, the lower of said bars being of greater length than the upper, a T-coupling attached to the upper of said bars, a T-coupling attached to the lower of said bars, said T-couplings arranged in alinement, a cylindrical sleeve connecting said couplings together, a resiliently mounted support extending through said couplings and sleeve and shiftable independently of these latter, a harp carried by the support, a trolley wheel journaled in the last mentioned harp, and means for limiting the upward movement of said support.

In testimony whereof I affix my signature in the presence of two witnesses.

FRANK STROSSER.

Witnesses:
H. A. SMITH,
JANET B. ROSENBAUM.

Copies of this patent may be obtained for five cents each, by addressing the "Commissioner of Patents, Washington, D. C."